United States Patent [19]

Wagner

[11] 4,207,657
[45] Jun. 17, 1980

[54] SEPARATING DEVICE FOR BAR AND PIPE-SHAPED WORKPIECES

[75] Inventor: Rudolf Wagner, Stuttgart, Fed. Rep. of Germany

[73] Assignee: REMS-WERK Christian Föll und Söhne GmbH & Co., Waiblingen, Fed. Rep. of Germany

[21] Appl. No.: 930,934

[22] Filed: Aug. 4, 1978

[30] Foreign Application Priority Data

Aug. 4, 1977 [DE] Fed. Rep. of Germany ....... 2735189

[51] Int. Cl.² ...................... B21B 15/00; B23B 13/00; B23B 47/00
[52] U.S. Cl. ..................................... 29/33 T; 29/563; 82/2.5; 82/20; 408/70
[58] Field of Search ................... 82/2.5, 2.7; 408/26, 408/28, 70; 29/33 T, 563

[56] References Cited

U.S. PATENT DOCUMENTS

| 304,367 | 7/1862 | Thiel | 82/2.5 X |
|---|---|---|---|
| 536,815 | 4/1895 | Murchex | 82/2.5 X |
| 1,782,692 | 11/1930 | Lawson | 82/20 |
| 2,004,540 | 6/1935 | Smith et al. | 408/70 X |
| 2,235,083 | 3/1941 | Poole | 408/70 X |
| 2,262,178 | 11/1941 | Gest et al. | 82/20 |
| 2,264,287 | 12/1941 | Betterton et al. | 82/20 X |
| 2,604,690 | 7/1952 | Rodder et al. | 82/20 X |
| 3,926,078 | 12/1975 | Ishizuka et al. | 82/2.5 |
| 3,987,523 | 10/1976 | Nelson | 29/33 T |
| 3,990,133 | 11/1976 | Schalles et al. | 82/2.5 |

FOREIGN PATENT DOCUMENTS 945259  8/1960  United Kingdom ...................... 29/563

Primary Examiner—Harrison L. Hinson
Attorney, Agent, or Firm—Becker & Becker, Inc.

[57] ABSTRACT

A separating device for bar and pipe-shaped workpieces, especially a cut-off machine, with a chucking device for chucking the cut-off workpieces and with a separating unit such as a cutting head for cutting off bar and pipe sections. The separating device includes at least one machining unit for machining the ends of the cut off workpieces and at least one feeding device for feeding a cut-off bar or pipe section cut off by the separating unit, to the end machining unit.

9 Claims, 11 Drawing Figures

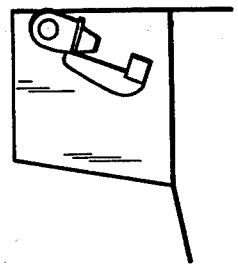
Fig.7
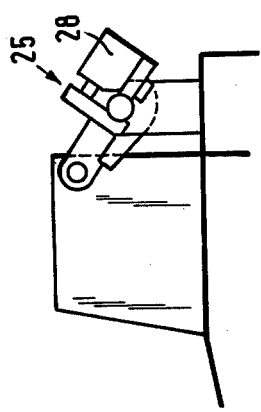
Fig.8
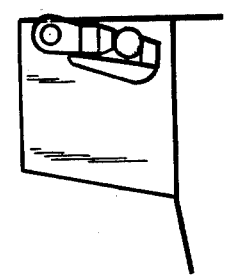
Fig.9
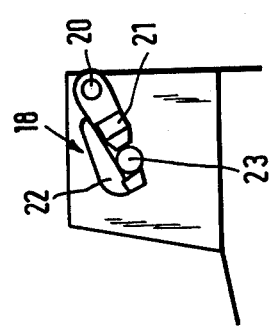
Fig.10
Fig.11
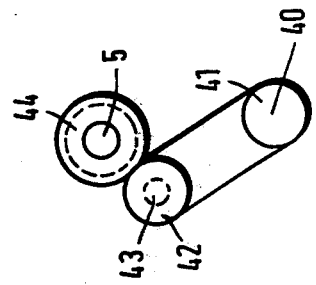

SEPARATING DEVICE FOR BAR AND PIPE-SHAPED WORKPIECES

The present invention relates to a separating device for bar-shaped and tubular workpieces, especially to a cutting-off machine with a chucking device for the workpieces to be cut off, and with a rotatably driven separating unit such as a cutting head.

It is known to cut sections from pipes and bars on sawing machines or cut-off turning machines. If the plane surfaces of the cut-off pipe and bar sections do not have to meet high requirements concerning clean cut, plane parallelism, and precision of the cut areas, as a rule a saw cut will suffice. However, when the cut surface has to be clean, plane parallel and precise, a cutting off turning machine is advantageously employed.

The cut-off sections cut off by the separating device are frequently additionally post-machined. For instance, with pipe sections, subsequent internal deburring is required or with bar sections, centering is required, for instance for further machining on a copying lathe, or additional drilling operations are to be carried out at the ends of the cut-off sections. These post-machining operations are carried out by end machining tools which follow the separating device. The separating device and machining tools following the same are customarily connected by a so-called loose linking which means between the two machines there is provided a more or less great buffer distance for the workpieces.

The end machining tool mounted as second machine following the sawing operation carries out the required plane machining in connection with the inner deburring and drilling and centering operation. When employing cutting-off turning machines which produce plane turned surfaces, the mounting of further customary end machining tools which as to power output are able to turn the plane surface of the cut-off workpiece, is not economical. For purposes of mounting the additional end machining tools, a separate bed is required and a relatively large placing surface is required in order to be able to mount the machines closely one next to the other.

It is, therefore, an object of the present invention so to design a cut-off device of the above mentioned type that simple end machining operations of the cut-off workpiece such as inner deburring of pipe sections or centering operations with bar sections can be carried out at economical costs.

This object and other objects and advantages of the invention will appear more clearly from the following specification in connection with the accompanying drawings, in which:

FIG. 1 diagrammatically illustrates a side view of a separating device according to the present invention.

Figure 4:
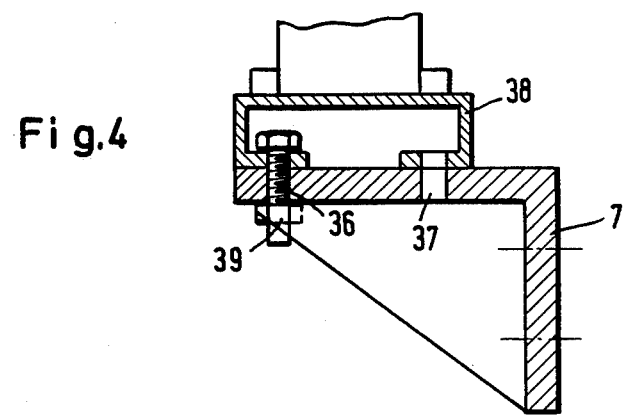

FIG. 4 diagrammatically shows the mounting of the base of the end machining unit on the table.

Figure 1:
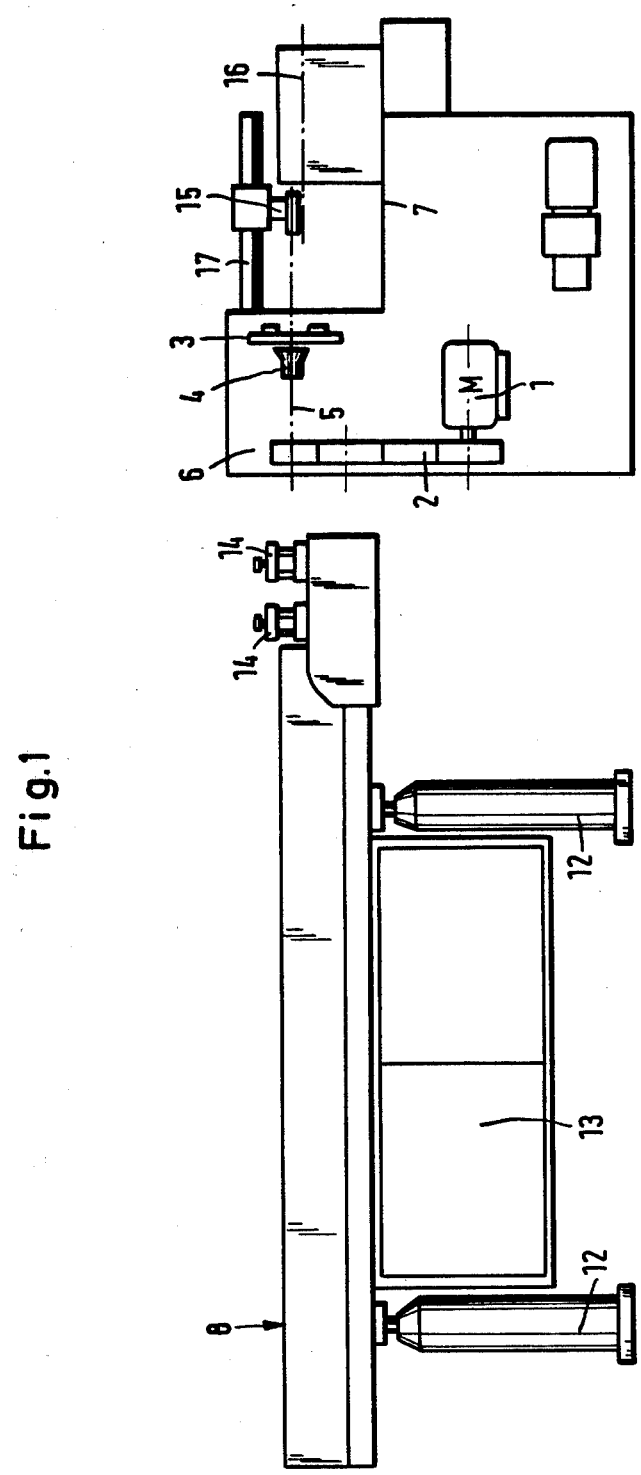
Figure 5:
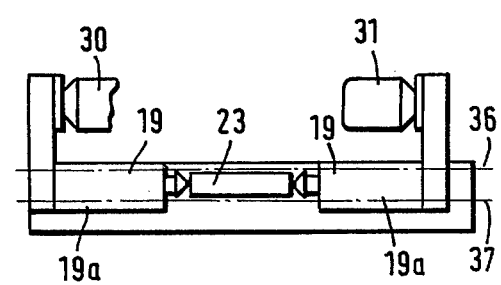

FIG. 5 is an enlargement of the machining unit portion of the separating device of FIG. 1.

Figure 6:
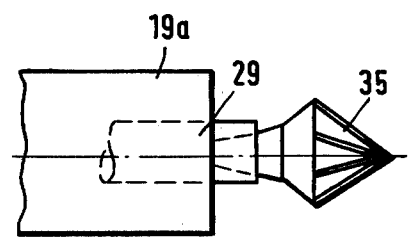

FIG. 6 shows in detail the machining tools of FIG. 5.

FIGS. 7–10 show in sequence the clamping of the workpiece, the transfer of the workpiece to the machining unit, clamping of the workpiece in the machining unit, and the return of the empty clamping head.

FIG. 11 diagrammatically illustrates the drive connection to the hollow spindle.

The separating device according to the present invention is characterized primarily in that on the separating device there is mounted at least one machining unit for machining the ends of the cut-off workpiece, and at least one feeding device which feeds the workpiece cut off from the separating unit to the end machining unit.

Thus, with the separating device according to the invention, the end machining unit is not a machine which has to be additionally mounted but is directly connected to the separating device. As a result thereof, no special foundation bed for mounting the end machining unit is required but the latter is directly supported and mounted on the separating device. If as separating device a cutting off machine is provided according to which the plane surfaces of the cut-off workpieces with pipe sections as well as with bar sections are already finish machined, it is merely necessary by means of subsequent end machining operation to carry out a secondary machining only for instance a centering or inner deburring. For this purpose, relatively small machining units will suffice so that the end machining operation of workpieces cut off on cut-off machines can be carried out economically. Immediately following the separating of the workpiece on the separating device, the cut-off workpiece is by the feeding device conveyed to the end machining unit. It will be appreciated that in this instance a so-called fixed connection is established inasmuch as the ends of the cut-off workpiece following the separation from the cut-off machine are directly post-machined by the end machining unit.

Referring now to the drawings in detail, the separating device illustrated therein comprises a motor 1, especially an electric motor, which through an infinitely variable transmission 2 and a step-down transmission drives a main spindle not illustrated in detail, which is directly connected to the cutting head 3. Mounted in the cutting head 3 are radially adjustable cutting jaws which for purposes of separating the workpiece are rotatably driven by the main spindle. During the cutting-off operation, the workpieces are by means of a chuck 4 held against rotation, said chuck being connected to a spindle 5. The spindle 5 is a hollow spindle and is arranged in a housing 6 which is located on a table 7 of the separating device. The chucking device comprises non-illustrated commonly known chucking jaws arranged along a circle about the axis of spindle 5 and adjustable in radial direction. The workpieces to be cut off are mounted on a supporting unit 8 which precedes the cutting off device. The unit 8 has a support 9 for the tubular and bar-shaped workpieces. From the support 9, the workpieces are automatically placed on the feeding rollers of a charging magazine 10 of the supporting unit 8. The non-illustrated feeding rollers of the charging magazine 10 are driven by a motor 11 of the supporting unit 8. For purposes of adapting the supporting unit 8 to differently high separating devices, the supporting unit 8 is mounted on vertically adjustable posts 12. Arranged at the bottom side of the support 9 and of the charging magazine 10 is a switch cabinet 13 from which the individual working operations can be surveyed and adjusted.

The workpieces charged by the support 9 onto the charging magazine 10 are by the driven feeding rollers transported in the direction toward the separating device and in this connection are precisely guided by guiding rollers 14. The transported workpiece enters through a non-illustrated opening in the spindle housing 6 and is passed through the chucking device 4 and subsequently through the cutting head 3 until one end abuts an abutment 15. The abutment 15 is mounted on the spindle housing 6 and can be adjusted in the direction of the axis 16 of the chucking device 4 and of the cutting head 3. Expediently, the abutment 15 comprises a sleeve-shaped member adjustably and arrestably mounted on a guiding rod 17 which is connected inside the spindle housing 6. By means of the abutment 15, the length of the pipe or bar section to be cut off will be set.

After the workpiece abuts against the abutment 15, the motor 11 is turned off so that the advance of the workpiece is stopped. Simultaneously with the turning off of the feed motor 11, the chucking device 4 is actuated, the chucking jaws of which are radially adjustable with regard to the jaws of the chucked workpiece and are adapted firmly to engage the outer circumference of the workpiece. It will be seen that in this way the workpiece is properly held against rotation during the cutting off operation carried out by the cutting head 3. After the workpiece has been chucked, motor 1 is preferably automatically turned on and through the transmission 2 drives the cutting head 3. The cutting jaws of said cutting head 3 are in this way rotated and simultaneously are radially advanced during the cutting operation so that the chucked workpiece while rotating is being cut off.

Figure 3:
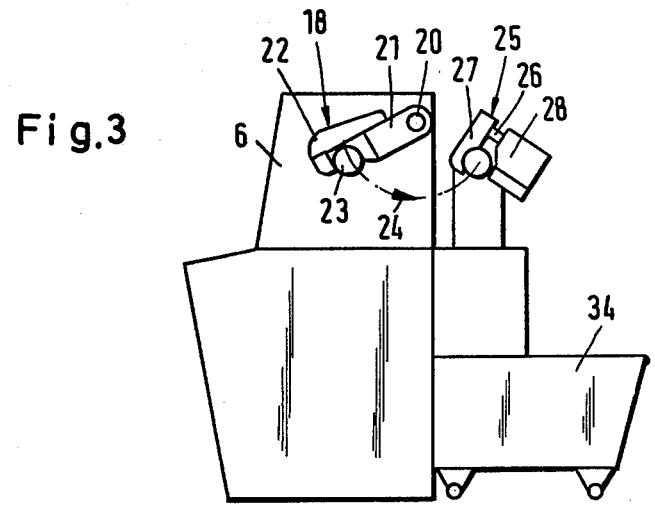
FIG. 3 is a diagrammatic fragmentary view of the separating device according to FIGS. 1 and 2.

Mounted on the separating device is a feeding device 18 by means of which the workpiece cut off by the cutting head 3 is transported to an end machining unit 19 likewise mounted on the separating device (FIG. 3). The feeding device 18 is expediently mounted on the spindle housing 6 so that no separate support is necessary. The feeding device has an arm 21 which is pivotable about an axis 20 and which carries a clamping part 22 that is displaceably mounted for movement in the longitudinal direction of the arm 21. The workpiece 23 separated from the cutting head 3 is clamped fast between the clamping part 22 and a counter-abutment on arm 21. The workpiece 23 is expediently already prior to the cutting off of the tubular or bar-shaped section clamped fast to the clamping part 22 by means of the cutting head 3.

The control of the clamping part 22 is expediently effected automatically. In this way, the workpiece is during the cutting off operation clamped fast by the clamping part 22 and arm 21 in addition to the chucking device 4 so that the workpiece is particularly toward the end of the cutting operation safely held.

Figure 2:
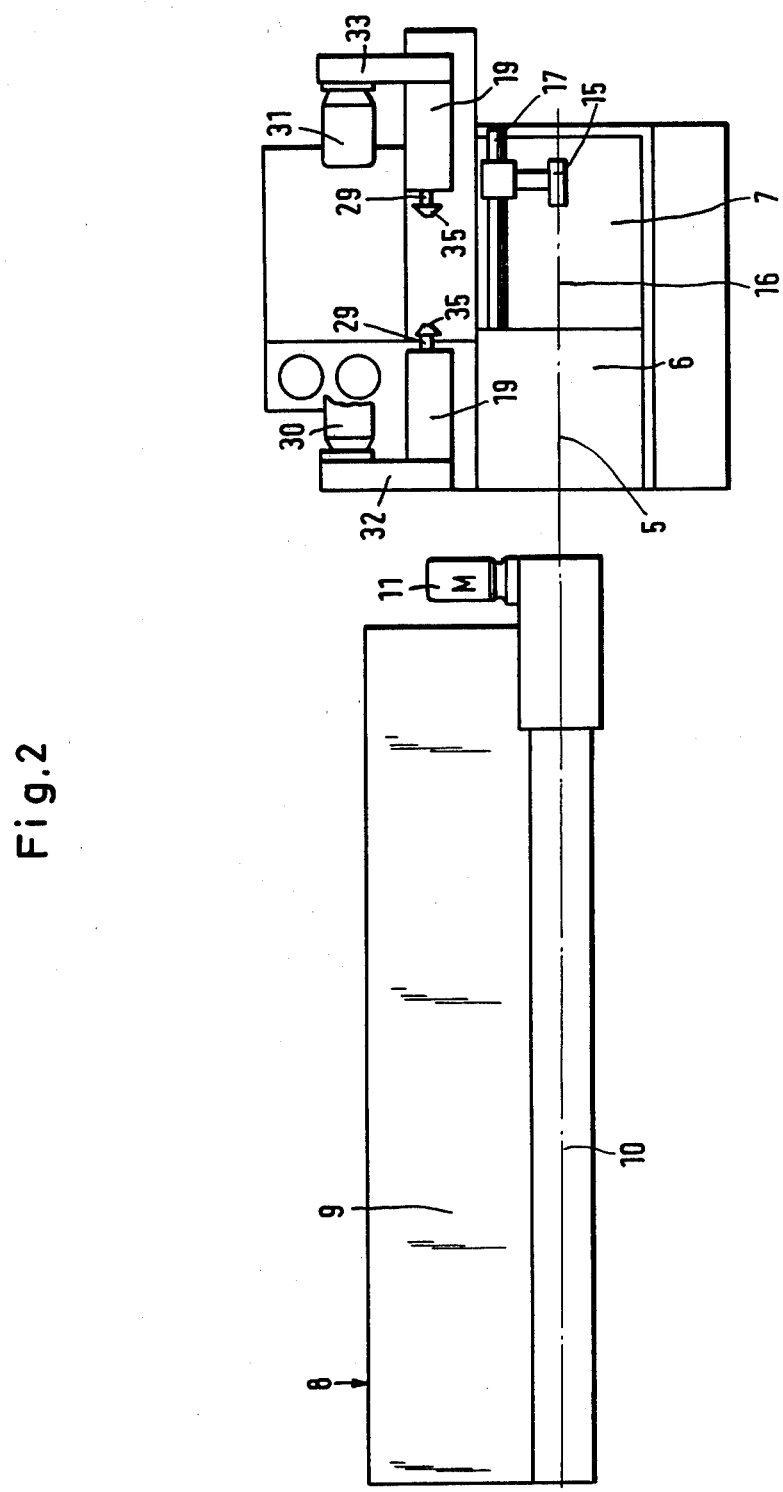
FIG. 2 represents a diagrammatic top view of the separating device according to FIG. 1.

After the workpiece 23 has been cut off, the pivotable arm 21 is automatically actuated so that it pivots in the direction of the arrow 24 in FIG. 3 toward a clamping device 25 which comprises a clamping part 27 displaceably mounted on guiding rods 26. The guiding rods 26 are mounted in a counter-clamping part 28 of the clamping or chucking device 25. When the arm 21 pivots in the direction toward the clamping or chucking device 25, the device 25 occupies its opened position in which the clamping part 27 is spaced from the counter-clamping part 28 by such a distance that the workpiece 23 can be introduced between the clamping part 27 and the counter-clamping part 28. Thereupon the clamping part 27 is controlled so as to be displaced toward the counter-clamping part 28 until the workpiece 23 is firmly chucked between the clamping part 27 and the counter-clamping part 28. The clamping part 22 of the feeding device 18 will then release the workpiece 23. Subsequently, the drive of the pivotable arm 21 is automatically reversed so that the pivot arm pivots back in the direction counter to the direction of the arrow 24 in FIG. 3, i.e. to its starting position. After said pivotable arm has reached its starting position, the drive for the pivotable arm 21 is turned off and at the same time the motor 11 of the supporting unit 8 is turned on so that the next workpiece will be transferred from the support 9 to the charging magazine 10 and will be transported to the separating device. The machine is now ready for a new working cycle. In order to make sure that both ends of the cut-off workpiece can be machined simultaneously, preferably two end machining units 19 are mounted on the separating device as shown in FIG. 2. Principally, also one machining unit may suffice. In such an instance, however, it is necessary to turn the workpiece by 180° after one end has been machined. The machining units 19 are located within the region adjacent the cutting head 3 and the chucking device 4 and adjacent the spindle housing 6. As a result thereof, the separating device has only a relatively short length and consequently can advantageously also be employed where only limited space is available. Expediently, the axes of the end machining units are parallel to the common axis of the cutting head 3 and the chucking device 4. This has the advantage that the workpiece 23 cut off by the cutting head 3 has merely to be displaced parallelly in order that it will occupy the new position necessary for machining the ends of the workpiece. This transporting of the workpiece 23 can consequently also be effected by a simple pivoting operation as described above. The machining units 19 are respectively through the intervention of dead centers, tail spindles or spindle sleeves 29 advanced in axial direction of the workpiece until the tools of the machining units 19 engage the ends of the workpiece. Expediently, the two machining units 19 are respectively driven by a separate motor 30,31 so that the two units can be advanced independently of each other. The motors 30, 31 are axis parallel to the machining units and are drivingly connected by means of the transmissions 32, 33 to the machining tools 35. The motor 30, 31 are located on that side of the machining unit which faces away from the spindle housing 6. The machining of the ends of the workpieces by means of the two units 19 is effected as long as the next workpiece is advanced from the supporting unit 8 of the separating device, and is being separated on the separating device. After the end machining has been effected, the clamping part 27 is automatically moved out and thereby frees the finished machine workpiece which then drops into a storage container 34. The separating device is so controlled that the end machining of the workpiece is finished when the arm 21 with the next cut-off workpiece 23 is pivoted toward the chucking device 25.

The right hand machining unit 19 with regard to FIG. 2 which faces away from the cutting head 3 is displaceably and removably mounted so that this unit, if necessary, can at any time be displaced. In this way, it will for instance be possible to cut off workpieces to the length of about 10 meters and to machine the ends thereof by means of the two units 19. For the displaceably arranged unit 19, no corresponding bed length or adjustment of the unit on said bed is required, but this unit, inasmuch as it is small and relatively light, can be mounted on a simple support separate from the cutting device. As a result thereof, cut-off sections of different lengths can be obtained in an economical manner.

By means of the separating device according to the invention, different diameters can be cut off from tubular and bar-shaped workpieces and can be machined at their ends. By means of the machining units 19, it is possible for instance to carry out centering or inner deburring operations at the ends of the workpieces. The design according to the present invention is particularly suitable for cutting-off machines because such machines produce turned and plane parallel endfaces when cutting off the workpieces so that only simpler end machining operations have to be carried out such as centering, and inner deburring or a boring operation. These end machining operations can be carried out by small machining units at the desired precision.

It is, of course, to be understood that the present invention is, by no means, limited to the specific showing in the drawings, but also comprises any modifications within the scope of the appended claims.

Further details of the separating device and its operation are illustrated in FIGS. 4–11.

With reference to FIGS. 4–6, the end machining unit 19 is adjustably mounted in the axial direction of the workpiece 23. The adjustable mounting is effected by means of longitudinal slots 1,2 in the table 7. The base 38 of the machining unit 19 is displaceably mounted in the longitudinal slots 1,2 in a direction perpendicular to the plane of FIG. 4. The displacement can be effected by loosening the locking bolts 4. FIG. 6 partially illustrates the housing 19a for the end machining unit 19. The machining tools 35 are associated with the dead centers (Pinole) 29 for machining the workpiece 23 (FIG. 5). The adjustment is accomplished as follows: first, the base 38 of the machining unit 19 is roughly adjusted by being displaced in the slots 1,2 and then firmly bolted in by means of the locking bolts 39. Then the machining tools 35 are themselves adjusted. Thus, the advancement of the machining tools 35 to the workpiece, for example the pipe 23, is effected by means of the dead centers 29.

FIGS. 7–10 show the sequential operation for the separating device and the first step of separating the workpiece 23 by means of the separating unit 3, FIG. 7 shows the clamping of the workpiece 23 which is to be cut off. For this purpose, a customary arm or clamping head, such as a clamping piston, is moved against the workpiece 23 in the direction of the axis 20. The workpiece 23 is then clamped against the arm bracket or clamping part 22. In this position, i.e., after being clamped, the workpiece 23 is cut off. After this cutting off operation, the transfer unit or heating device 18 is pivoted downwardly into the position shown in FIG. 8. From this position, the cut-off workpiece 23 is transferred into the machining position shown in FIG. 9. In this position, the workpiece 23 is released as the feeding device 18 is opened, in particular, the clamping piston 21 returns in the opposite direction. At the same time, the workpiece 23 is taken over by the clamping device 25 for the end machining, and is clamped by this device 25. After the workpiece 23 is again clamped, namely by the device 25, the feeding device 18, as shown in FIG. 10, returns to the starting position shown in FIG. 7, so that the entire process can again be repeated in the same manner.

FIG. 11 shows in detail the drive connection of FIG. 1, and in particular, the drive connection of the motor 1 to the main spindle. A lower belt pulley 41 is connected to the drive shaft 40 of the motor 1. The lower belt pulley 41 is connected to the upper belt pulley 42 by means of a customary drive belt. The pulleys 41 and 42 thus produce an infinitely variable belt drive which is driven by the motor 1. A toothed gear 43 is mounted on the axis of the belt pulley 42, and meshes with the toothed gear 44 which is rotatably mounted on the fixed hollow spindle 5, thus forming a positive connection with the separating unit 3. Therefore, when the toothed gear 44 is driven, it also effects a driving of the separating unit 3.

What is claimed is:

1. A separating device, especially cut-off machine, for bar and pipe-shaped workpieces, which includes in combination: a support, a rotatably driven separating unit supported by said support for cutting off a section from pipe and bar stock, a chucking device also supported by said support for chucking the section to be cut off from said stock, machining means also supported by said support for machining the ends of the respective cut-off section, and a combined pick-up and transfer unit supported also by said support and operable to pick up a cut-off section from said first chucking device and transfer said cut-off section to said machining means, said machining means itself including a second chucking device located in feeding range of said combined pick-up and transfer unit for holding the cut-off section during its end face machining, said separating unit and said machining means as well as said combination pick-up and transfer unit being arranged in common on said support, said machining means including at least one machining unit and being arranged within the area of and adjacent said separating unit, said combined pick-up and transfer unit including chucking means for chucking the section to be picked up and transferred to said machining means, said combined pick-up and transfer unit being pivotally supported by said support.

2. A separating device in combination according to claim 1, in which said second chucking device is so arranged in the pick-up and transfer path of said combined pick-up and transfer unit that the picked-up and transferred section chucked by said second chucking device will be located within the working region of said machining means.

3. A separating device in combination according to claim 1, in which said machining means are adjustable in the axial direction of the cut-off section to be machined.

4. A separating device in combination according to claim 3, in which said machining means are axially adjustable by dead center means.

5. A separating device in combination according to claim 1, which includes individual motor means for driving said machining means.

6. A separating device in combination according to claim 1, which includes a successive drive system comprising a first step drive operatively connected to said separating unit for cutting off a section from the stock, a second step drive operative subsequent to the action of said first step drive and operatively connected to said chucking means of said combined pick-up and transfer unit for chucking the section cut off by said separating unit, and a third step drive operative subsequent to the action of said second step drive and operatively connected to said combined pick-up and transfer unit for moving the latter in the direction toward said second chucking device.

7. A separating device in combination according to claim 6, in which said successive drive system includes a fourth step drive operative subsequent to the action of said third step drive and operatively connected to said combined pick-up and transfer unit for returning the latter to its pick-up position for picking up a section cut-off by said separating unit.

8. A separating device in combination according to claim 1, in which the axes of said separating unit and said first chucking device are substantially parallel to the axis of said machining means.

9. A separating device in combination according to claim 1, in which the pivoting axis of said combined pick-up and transfer unit is substantially parallel to the axis of said separating unit.

* * * * *